US008280829B2

(12) United States Patent
Chapelle et al.

(10) Patent No.: US 8,280,829 B2
(45) Date of Patent: Oct. 2, 2012

(54) EFFICIENT ALGORITHM FOR PAIRWISE PREFERENCE LEARNING

(75) Inventors: Olivier Chapelle, Sunnyvale, CA (US); Sathiya Keerthi Selvaraj, Cupertino, CA (US)

(73) Assignee: Yahoo! Inc., Sunnyvale, CA (US)

( * ) Notice: Subject to any disclaimer, the term of this patent is extended or adjusted under 35 U.S.C. 154(b) by 585 days.

(21) Appl. No.: 12/504,460

(22) Filed: Jul. 16, 2009

(65) Prior Publication Data

US 2011/0016065 A1 Jan. 20, 2011

(51) Int. Cl.
*G06F 15/18* (2006.01)
(52) U.S. Cl. .......................... 706/12; 707/723
(58) Field of Classification Search .......... 706/12; 707/723
See application file for complete search history.

(56) References Cited

U.S. PATENT DOCUMENTS

| 7,440,944 | B2 | 10/2008 | Selvaraj et al. |
| 2009/0089274 | A1 | 4/2009 | Chapelle |

OTHER PUBLICATIONS

Olivier Chapelle (an online article "ranksvm.m" last modified on Aug. 2006).*
Chapellet et al ("'Efficient Algorithms for Ranking with SVMs" Jul. 20, 2009).*
Boottou et al., "The Tradeoffs of Large Scale Learning," NSF Grant CCR-0325463, printed Jul. 15, 2009, 8 pages.
Burges et al., "Learning to Rank Using Gradient Descent," Microsoft Research, Proceedings of the 22nd International Conference on Machine Learning, Boon, Germany, 2005, 8 pages.
Burges et al., "Learning to Rank With Nonsmooth Cost Functions," Microsoft Research, printed Jul. 15, 2009, 8 pages.
Cao et al., "Adapting Ranking SVM to Document Retrieval," Microsoft Research, SIGIR, Seattle, Washington, Aug. 6-11, 2006, 8 pages.
Cao et al., "Learning to Rank: From Pairwise Approach to Listwise Approach," Microsoft Research, printed Jul. 15, 2009, 9 pages.
Chapell, Olivier, "Large Scale Support Vector Machines," Yahoo Research, Oct. 23, 2007, 49 pages.
Chapell, Olivier, "Training a Support Vector Machine in the Primal," Aug. 30, 2006, pp. 1-22.
Dembo, Ron S., "Truncated-Newton Algorithms for Large-Scale Unconstrained Optimization," TIMS-ORSA Joint National Meeting, Washington, D.C., May 1980, pp. 190-212.
Freund et al., "An Efficient Boosting Algorithm for Combining Preferences," Journal of Machine Learning Research 4, 2003, pp. 933-969.
Joachims, Thorsten, "Optimizing Search Engines Using Clickthrough Data," 2002, 10 pages.
Joachims, Thorsten, "Training Linear SVMs in Linear Time," Aug. 20-23, 2006, 10 pages.
Joachims, Thorsten, "A Support Vector Method for Multivariate Performance Measures," Proceedings of 22nd International Conference on Machine Learning, Bonn, Germany, 2005, 8 pages.

(Continued)

*Primary Examiner* — Lut Wong
(74) *Attorney, Agent, or Firm* — SNR Denton US LLP

(57) ABSTRACT

In one embodiment, training a ranking model comprises: accessing the ranking model and an objective function of the ranking model; accessing one or more preference pairs of objects, wherein for each of the preference pairs of objects comprising a first object and a second object, there is a preference between the first object and the second object with respect to the particular reference, and the first object and the second object each has a feature vector comprising one or more feature values; and training the ranking model by minimizing the objective function using the preference pairs of objects, wherein for each of the preference pairs of objects, a difference between the first feature vector of the first object and the second feature vector of the second object is not calculated.

33 Claims, 3 Drawing Sheets

OTHER PUBLICATIONS

Keerthi et al., "A Modified Finite Newton Method for Fast Solution of Large Scale Linear SVMs," Journal of Machine Learning Research, 2005, pp. 341-361.
Keerthi et al., A Fast Tracking Algorithm for Generalized LARS/LASSO, IEEE Transactions on Neural Networks, vol. xx, No. x, January, pp. 1-6, Printed Jul. 15, 2009.
Kimeldorf et al., "A Correspondence Between Bayesian Estimation on Stochastic Processes and Smoothing by Splines," The Annals of Mathematical Statistics, vol. 41, No. 2, pp. 1970, 495-502.
Lewis et al., "RCV1: A New Benchmark Collection for Text Categorization Research," Journal of Machine Learning Research 5, pp. 361-397, 2004.
Liu et al., "LETOR: Benchmark Dataset for Research on Learning to Rank for Information Retrieval," SIGIR 2007 Workshop on Learning to Rank for Information Retrieval, pp. 3-10, 2007.
Microsoft, "Ranking SVM on LETOR," Introduction to Ranking SVM, Printed Jun. 9, 2009, 3 pages.
Scholkopf, Bernhard, "Learning with Kernels," Feb. 2006, 179 pages.
Shalev-Scwartz et al., "Pegasos: Primal Estimated sub-GrAdient SOLver for SVM," Proceedings of the 24th International Conference on Machine Learning, 2007, 8 pages.
Shewchuk, Jonathan Richard, "An Introduction to the Conjugate Gradient Method Without the Agonizing Pain," Aug. 4, 1994, 64 pages.
Carterette et al., "Learning a Ranking from Pairwise Preferences," SIGIR 2006, Aug. 6-10, 2006, Seattle, Washington, 2 pages.
Tsochantaridis et al., "Large Margin Method for Structured and Interdependent Output Variables," Journal of Machine Learning Research 6, 2005, pp. 1453-1484.
Zheng et al., "A General Boosting Method and its Application to Learning Ranking Functions for Web Search," Yahoo, Inc., pp. 1-8.
Aizerman et al., "Theoretical foundations of the potential function method in pattern recognition learning," *Automation and Remote Control* 25: 821-837 (1964).
Chapelle, "Optimization techniques for support vector machines," talk at the workshop on *Numerical Tools and Fast Algorithms for Massive Data Mining, Search Engines and Applications*, UCLA, http://ipm.ucla.edu/publications/sews2/sews2_7130.pdf, 49 pages, Oct. 23, 2007.
Cossock, "Subset ranking using regression," *Proceedings of the 19th Annual Conference on Learning Theory*, Springer, *Lecture Notes in Computer Science*, vol. 4005, pp. 605-619, 2006.
Herbrich et al., "Large margin rank boundaries for ordinal regression," *Advances in Large Margin Classifiers*, Smola, Bartless, Schoelkopf, Schuurmans (eds), MIT Press, Cambridge, MA, 20 pages, 2000.
Keerthi et al., "A Fast Tracking Algorithm for Generalized LARS/LASSO," *IEEE Transactions on Neural Networks* 18(6): 1826-1830 (Nov. 2007).
Grinspan, P. V., "A connection between dcg and a pairwise-defined loss function," internal Yahoo! memo, 2 pages, Jan. 20, 2007.

\* cited by examiner

EFFICIENT ALGORITHM FOR PAIRWISE PREFERENCE LEARNING

TECHNICAL FIELD

The present disclosure generally relates to training a ranking model using pairwise training data.

BACKGROUND

In general, ranking, as applied to a set of objects, indicates the relationships between the objects such that, for any two objects from the set, the first object is either ranked higher than, ranked lower than, or ranked equal to the second object. Often, the ranking of a set of objects is determined with respect to a particular reference such that the ranks of any two objects from the set indicate whether the first object is more preferred than, less preferred than, or equally preferred as the second object with respect to the reference.

Ranking has many applications. For example, a common application of ranking is in the field of Internet search. The Internet provides access to a vast amount of information. The information is stored at many different sites, e.g., on computers and servers and in databases, around the world. These different sites are communicatively linked to the Internet via various network infrastructures. People, i.e., Internet users, may access the publicly available information on the Internet via various suitable network devices connected to the Internet, such as, for example, computers and telecommunication devices.

Due to the sheer amount of information available on the Internet, it is impractical as well as impossible for an Internet user to manually search throughout the Internet for specific pieces of information. Instead, most Internet users rely on different types of computer-implemented tools to help them locate the desired information. One of the most convenient and widely used tools is a search engine, such as the search engines provided by Yahoo!® Inc. (http://search.yahoo.com), Google™ (http://www.google.com), and Microsoft® Inc. (http://search.live.com).

To search for the information relating to a specific topic or subject matter, an Internet user provides a short phrase consisting of one or more words, often referred to as a "search query", to a search engine. The search query typically describes the topic or subject matter. The search engine conducts a search based on the search query using various search algorithms to identify one or more Internet contents most likely to be related to the topic or subject matter described by the search query. Internet contents are data or information available on the Internet and may be in various formats, such as texts, audios, videos, graphics, etc. The search engine usually arranges, i.e., ranks, the identified Internet contents according to their degrees of relevance to the search query such that an Internet content that is relatively more relevant to the search query is ranked higher and presented before an Internet content that is relatively less relevant to the search query. In this case, an Internet content that is relatively more relevant to the search query is more preferred with respect to the search query than an Internet content that is relatively less relevant to the search query.

The identified Internet contents arranged in an order of relevance with respect to the search query is often referred to as a "search result" obtained in response to the search query. The search result may then be presented to the user requesting the search, often in the form of a list of clickable links, each link being associated with a different web page containing some of the Internet contents identified by the search engine. The user then is able to click on the individual links to view the specific contents as he wishes.

There are continuous efforts to improve the performance qualities of the search engines. Accuracy, completeness, presentation order, and speed are but a few aspects of the search engines for improvement.

SUMMARY

The present disclosure generally relates to training a ranking model using pairwise training data.

In particular embodiments, a pairwise training model is trained by minimizing an objective function of the ranking model using one or more preference pairs of objects. In particular embodiments, for each preference pair of objects, there is an indication that one of the objects is preferred over the other one of the objects with respect to a reference. In addition, each object in each preference pair of objects has a feature vector that has one or more feature values characterizing the properties of the object, the corresponding reference, or the object and the corresponding reference together. In particular embodiments, the objective function is minimized by iteratively applying the preference pairs of objects to the objective function in order to adjust one or more of the parameters in the objective function until a stopping criterion is satisfied.

In particular embodiments, the difference between the two feature vectors of the two objects in each preference pair of objects used to train the ranking model is never explicitly calculated during the training process. As a result, the training process may be performed more efficiently, and in some cases, may be sped up significantly.

These and other features, aspects, and advantages of the disclosure are described in more detail below in the detailed description and in conjunction with the following figures.

BRIEF DESCRIPTION OF THE DRAWINGS

The present disclosure is illustrated by way of example, and not by way of limitation, in the figures of the accompanying drawings and in which like reference numerals refer to similar elements and in which.

DETAILED DESCRIPTION OF EXEMPLARY EMBODIMENTS

Figure 1:
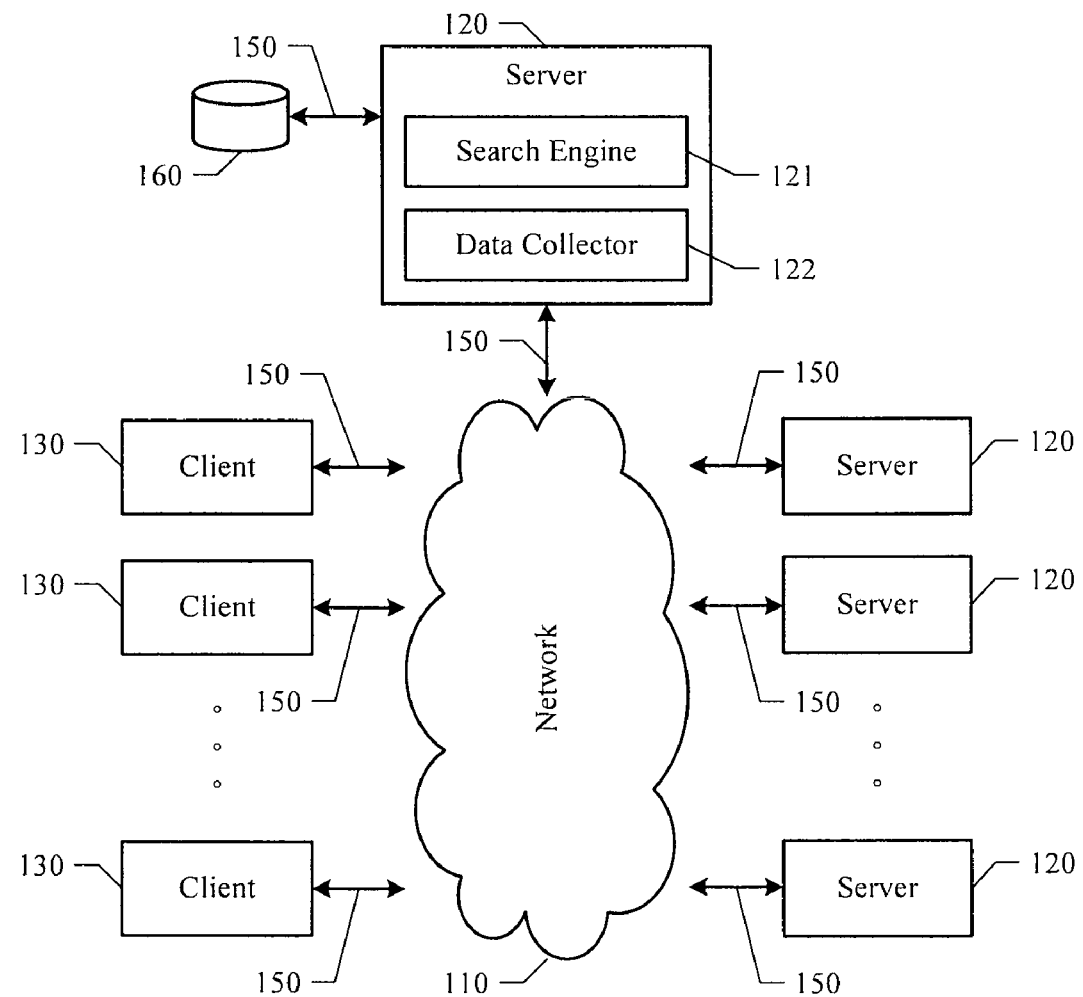
FIG. 1 illustrates an example network environment.

The present disclosure is now described in detail with reference to a few exemplary embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps or structures have not been described in detail in order to not unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

Ranking has many applications, one of which is in the field of Internet search. The search engines may implement one or more ranking algorithms to rank the Internet contents identified for the search queries, usually according to the degrees of relevance of the individual Internet contents with respect to the search queries. Examples of the commonly implemented ranking algorithms include pointwise, pairwise, and listwise methods. In case of ranking, a set of objects is obtained in response to a reference, e.g., a set of Internet contents being identified in response to a search query, and is ranked according to their degrees of preference with respect to the reference, e.g., the identified Internet contents being ranked according to their degrees of relevance with respect to the search query.

The ranking of the objects may be performed automatically, e.g., by computers. In particular embodiments, a ranking model may be constructed that performs the actual ranking of the objects with respect to specific references. There are different types of ranking models. In particular embodiments, a ranking model may determine a particular ranking score for each of a set of objects with respect to a reference. The objects may then be ranked according to their respective ranking scores, e.g., with objects having relatively higher ranking scores ranked higher than objects having relatively lower scores.

The ranking model may be implemented as computer software that is executed on one or more computer systems. In particular embodiments, to improve the quality of the ranking model, e.g., the accuracy of the ranking scores determined for the individual objects with respect to the corresponding references, the ranking model may be trained using some type of training data before or while being utilized in practical situations, e.g., for ranking search results. In particular embodiments, the training data may be pairwise training data that include multiple preference pairs of objects. The pairwise training data are described in more detail below. The process of training a ranking model may be considered as a particular form of machine learning.

In particular embodiments, the pairwise training data used to train a ranking model include preference pairs of objects that are similar in nature as the actual objects the ranking model is used to rank. For example, if the ranking model is used to rank Internet contents identified for the search queries, then the pairwise training data may also be a collection of Internet contents obtained by conducting searches on a collection of search queries using one or more search engines. A preference pair of objects is two objects between which there is a preference for one of the two objects over the other one of the two objects. That is, one of the two objects is more preferred over the other one of the two objects with respect to a reference. The pairwise training data may include multiple pairs of objects where the preference between each pair of objects is known.

Many existing methods of training the ranking models are slow and inferior in performance qualities. To improve, e.g., speed up, the training process, in particular embodiments, a ranking model is trained using the pairwise training data by minimizing an objective function of the ranking model and the gradient of the objective function using the pairwise training data. As explained above, the pairwise training data may include one or more preference pairs of objects, and between each preference pair of objects, there is an indication that one of the objects is more preferred than the other one of the objects with respect to a reference. The objective function is minimized by iteratively applying the preference pairs of objects to the objective function in order to adjust one or more of the parameters in the objective function until a stopping criterion is satisfied. In particular embodiments, the pairwise training process described in the present disclosure may be as much as $10^5$ times faster than the currently existing methods of training the ranking models.

Because the ranking models are widely implemented by the search engines, the pairwise training process is described in more detail below in the context of Internet search. That is, the ranking models subject to the pairwise training process are assumed to be used for ranking the Internet contents identified for the search queries, and the pairwise training data may consist of one or more preference pairs of Internet contents, and for each preference pair of Internet contents, there is an indication that one of the two Internet contents is more relevant than the other one of the two Internet contents with respect to a particular search query. Nevertheless, note that the pairwise training process may be used to train ranking models for any type of applications.

Particular embodiments may be implemented in a network environment. FIG. 1 illustrates an example network environment 100. Network environment 100 includes a network 110 coupling one or more servers 120 and one or more clients 130 to each other. In particular embodiments, network 110 is an intranet, an extranet, a virtual private network (VPN), a local area network (LAN), a wireless LAN (WLAN), a wide area network (WAN), a metropolitan area network (MAN), a portion of the Internet, or another network 110 or a combination of two or more such networks 110. The present disclosure contemplates any suitable network 110.

One or more links 150 couple a server 120 or a client 130 to network 110. In particular embodiments, one or more links 150 each includes one or more wired, wireless, or optical links 150. In particular embodiments, one or more links 150 each includes an intranet, an extranet, a VPN, a LAN, a WLAN, a WAN, a MAN, a portion of the Internet, or another link 150 or a combination of two or more such links 150. The present disclosure contemplates any suitable links 150 coupling servers 120 and clients 130 to network 110.

In particular embodiments, each server 120 may be a unitary server or may be a distributed server spanning multiple computers or multiple datacenters. Servers 120 may be of various types, such as, for example and not by way of limitation, web server, news server, mail server, message server, advertising server, file server, application server, exchange server, database server, or proxy server. In particular embodiments, each server 120 includes hardware, software, or embedded logic components or a combination of two or more such components for carrying out the appropriate functionalities implemented or supported by server 120. For example, a web server is generally capable of hosting websites containing web pages or particular elements of web pages. More specifically, a web server may host HTML files or other file types, or may dynamically create or constitute files upon a request, and communicate them to clients 130 in response to HTTP or other requests from clients 130. A mail server is generally capable of providing electronic mail services to various clients 130.

In particular embodiments, a client 130 enables an Internet user at client 130 to access network 110. As an example and not by way of limitation, a client 130 may be a desktop computer system, a notebook computer system, a netbook computer system, a handheld electronic device, or a mobile telephone having a web browser, such as Microsoft Internet Explore, or Mozilla Firefox, which, for example, may have one or more add-ons, plug-ins, or other extensions, such as Google Toolbar or Yahoo Toolbar. The present disclosure contemplates any suitable clients 130.

In particular embodiments, one or more of servers 120 includes a search engine 121. In particular embodiments, search engine 121 includes hardware, software, or embedded logic component or a combination of two or more such components for generating and returning search results identifying Internet contents responsive to search queries received from clients 130. The present disclosure contemplates any suitable search engine 121. As an example and not by way of limitation, search engine 121 may be Altavist™, Baidu, Google, Windows Live Search, or Yahoo!® Search. In particular embodiments, search engine 121 may implement various search, ranking, and summarization algorithms. The search algorithms may be used to locate specific Internet contents for specific search queries. The ranking algorithms may be used to rank a set of Internet contents located for a particular search query. The summarization algorithms may be used to summarize individual Internet contents. In particular embodiments, one of the ranking algorithms employed by search engine 121 may be implemented based on the ranking model that is trained with the pairwise training process, which is described in more detail below.

In particular embodiments, one or more of servers 120 includes a data collector 122. In particular embodiments, data collector 122 includes hardware, software, or embedded logic component or a combination of two or more such components for monitoring and collecting network traffic data at search engine 121. In particular embodiments, the network traffic data collected include at least the search queries received at search engine 121. In addition, the network traffic data collected may also include, for example, the time each of the search queries is received at search engine 121, the search results generated by search engine 121 in response to the search queries, and the individual Internet contents identified in each of the search results. A data storage 160 may be communicatively linked to sever 120 via a link 150 and may be used to store the collected network traffic data collected by data collector 122 for further analysis.

In particular embodiments, the ranking model implemented by search engine 121 may be trained on one or more of servers 120, one or more of clients 130, or one or more standalone computer systems (not shown). The pairwise training data may be obtained from the network traffic data collected by data collector 122.

Figure 2:
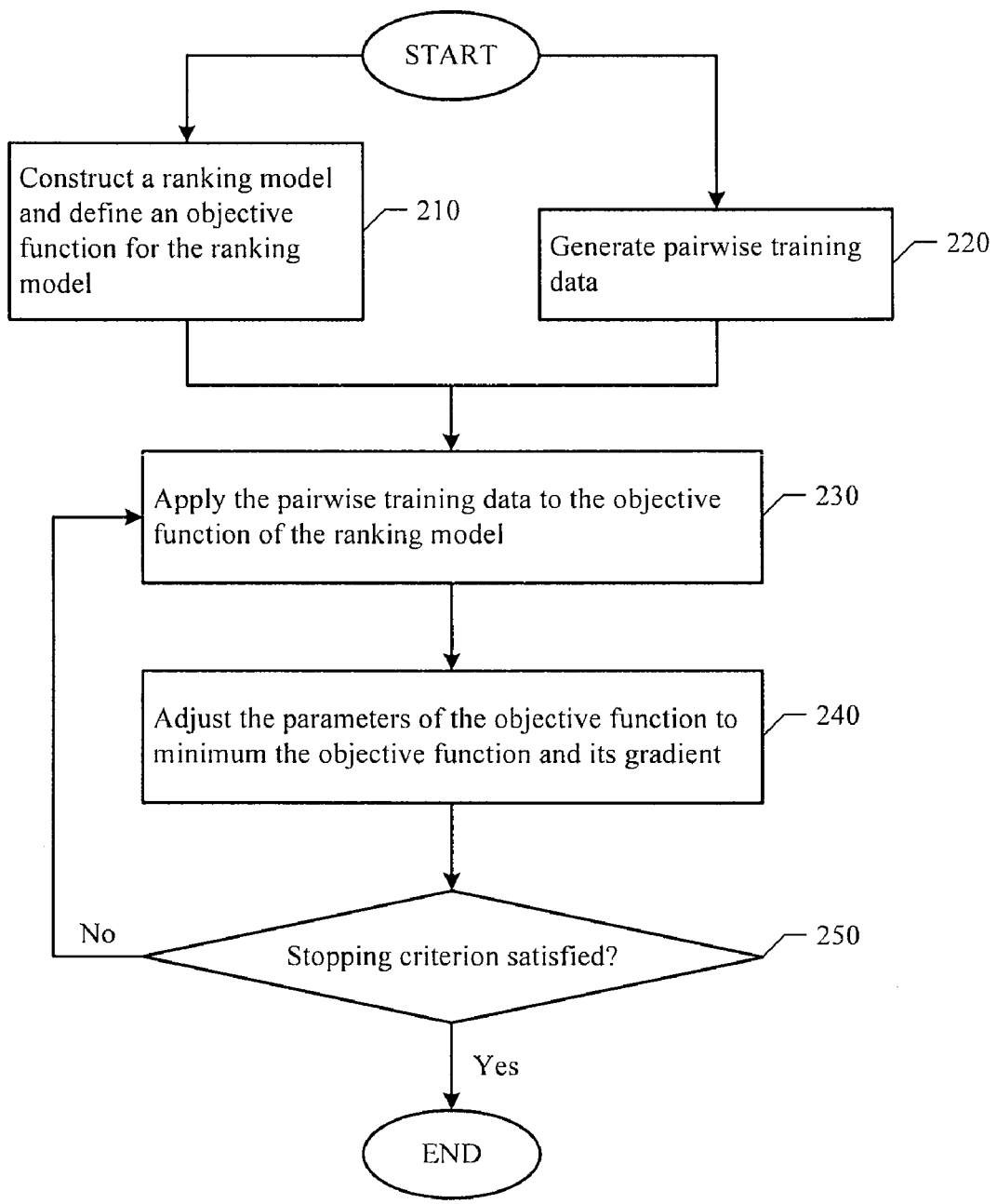
FIG. 2 illustrates an example method for training a ranking model using pairwise training data.

FIG. 2 illustrates an example method for training a ranking model using pairwise training data. In particular embodiments, at step 210, a ranking model is constructed. This is the ranking model to be trained with the pairwise training process. In particular embodiments, given a reference and a set of objects, the ranking model may determine a particular ranking score for each object in the set with respect to the reference. For example, for a set of Internet contents identified in response to a search query, the ranking model may determine a particular ranking score for each Internet content that indicates the level of relevance of the Internet content with respect to the search query. In particular embodiments, the ranking model has an objective function, and the training of the ranking model attempts to minimize the objective function of the ranking model. In particular embodiments, the ranking model is based on a Support Vector Machine (SVM) algorithm.

In particular embodiments, also at step 210, a suitable objective function may be defined for the ranking model. In particular embodiments, the objective function represents erroneous predictions made by the ranking model. Thus, in particular embodiments, the ranking model may be trained by minimizing its objective function since minimizing the objective function tends to minimize the number of erroneous predictions made by the ranking model. In particular embodiments, this minimization may be performed using gradient-based optimization techniques. The objective function of the ranking model is explained in more detail below.

In particular embodiments, at step 220, the pairwise training data are generated. The pairwise training data may be generated from various sources. In the example of Internet search, the pairwise training data may be generated from the network traffic data collected by data collector 122 and stored in data store 160. In particular embodiments, the pairwise training data may include: (1) one or more references, e.g., the search queries, and (2) one or more sets of objects obtained for the references, e.g., the sets of Internet contents identified for the search queries. In the example of Internet search, the search queries are the references and the Internet contents are the objects identified for the search queries. Hereafter, let $r_i$ denote a particular reference, e.g., a particular search query, and $O_i$ denote a set of objects obtained for $r_i$, e.g., a set of Internet contents identified for the particular search query by a search engine. In particular embodiments, $O_i$ includes one or more objects obtained in response to $r_i$, e.g., one or more Internet contents identified for the particular search query. Hereafter, let $o_{i,j}$ denote a particular object, e.g., a particular Internet content, in $O_i$.

In particular embodiments, in addition to the references and the sets of objects, the pairwise training data may also include: (3) for each set of objects, e.g., each set of Internet contents, one or more preference pairs of objects, where each preference pair of objects includes two different objects from the same set of objects, (4) for each preference pair of objects, an indication that one of the objects is relatively more preferred than the other one of the objects with respect to the reference corresponding to the set of objects to which the preference pair of objects belongs, and (5) for each object, a feature vector containing one or more feature values that characterize the properties of the object, the reference corresponding to the object, or the corresponding reference and object together.

In particular embodiments, each object in the pairwise training data may belong to one or more preference pairs of objects. For each object in the pairwise training data, regardless of to which preference pairs of object it belongs, the object has a feature vector that contains one or more feature values. In particular embodiments, the feature vectors of all the objects in the pairwise training data contain the same number of feature values. Hereafter, let $f_{i,j}$ denote the feature vector for $o_{i,j}$, and $f_{i,j,k}$ denote a particular feature value contained in $f_{i,j}$.

The following Table 1 illustrates the relationships between the references, objects, and the feature values of the objects. As illustrated, there may be one or more references; each reference has a corresponding set of objects that may include one or more objects; and each object has one or more feature values.

TABLE 1

Relationships between References, Objects, and Feature Values

| References | Objects | | Feature Values Corresponding to a Set of Features |
|---|---|---|---|
| $r_1$ | $O_1$ | $o_{1,1}$ | $f_{1,1} = \{f_{1,1,1}, \ldots, f_{1,1,k}, \ldots\}$ |
| | | ... | ... |
| | | $o_{1,j}$ | $f_{1,j} = \{f_{1,j,1}, \ldots, f_{1,j,k}, \ldots\}$ |
| | | ... | ... |

TABLE 1-continued

Relationships between References, Objects, and Feature Values

| References | Objects | | Feature Values Corresponding to a Set of Features |
|---|---|---|---|
| $r_i$ | $O_i$ | $o_{i,1}$ | $f_{i,1} = \{f_{i,1,1}, \ldots, f_{i,1,k}, \ldots\}$ |
| | | ... | |
| | | $o_{i,j}$ | $f_{i,j} = \{f_{i,j,1}, \ldots, f_{i,j,k}, \ldots\}$ |
| | | ... | |
| | | ... | |

The following Table 2 illustrates the relationships between the preference pairs of objects for a particular reference, e.g., $r_i$, and a corresponding set of objects, e.g., $O_i$. As illustrated, each preference pair of objects contains two different objects from the same set of objects, e.g., $(o_{i,1}, o_{i,2})$ from $O_i$, and for each preference pair of objects, there is an indication of which one of the two objects is more preferred with respect to the corresponding reference, e.g., $r_i$. For example, in Table 2, between $o_{i,1}$ and $o_{i,2}$, $o_{i,1}$ is more preferred with respect to $r_i$ than $o_{i,2}$, which may be indicated as $o_{i,1} > o_{i,2}$.

TABLE 2

Relationships between Unique Pairs of Objects for a Reference and a Set of Objects

| Reference | Objects | Preference Pairs of Objects | Preference Indication |
|---|---|---|---|
| $r_i$ | $O_i$ | $(o_{i,1}, o_{i,2})$ | $o_{i,1} > o_{i,2}$ |
| | | ... | |
| | | $(o_{i,1}, o_{i,j})$ | $o_{i,j} > o_{i,1}$ |
| | | ... | |
| | | $(o_{i,j}, o_{i,13})$ | $o_{i,j} > o_{i,13}$ |
| | | ... | |

In particular embodiments, when a pair of objects is obtained in response to a reference and has a preference indication with respect to the reference, the pair of objects is considered as a "preference pair of objects" with respect to the corresponding reference. Note that for a set of objects obtained in response to a reference, it is not necessary that all unique pairs of objects from the set are preference pairs of objects with respect to the reference. For example, if two objects are similarly or equally preferable with respect to the reference, that is, neither object is more preferred than the other object with respect to the reference, then these two objects may not have a preference indication and thus are not a preference pair of objects.

In particular embodiments, each object has a feature vector that includes one or more feature values. In particular embodiments, for every object from every set of objects, its feature values are determined with respect to the same set of features. A particular feature value characterizes a property of the object, the reference for which the object is obtained, or the object and its corresponding reference together. Consider the example preference pair of objects, $(o_{i,1}, o_{i,2})$, with a preference indication of $o_{i,1} > o_{i,2}$ with respect to $r_i$. $o_{i,1}$ has feature values $\{f_{i,1,1}, \ldots, f_{i,1,k}, \ldots\}$ characterizing properties of $(o_{i,1}, o_{i,2})$ or $r_i$, and $o_{i,2}$ has feature values $\{f_{i,2,1}, \ldots, f_{i,2,k}, \ldots\}$ characterizing properties of $(o_{i,1}, o_{i,2})$ or $r_i$.

Different types of ranking problems may have different features. In particular embodiments, the set of features may be selected based on the type of references and objects used in the pairwise training data. Examples For example, for documents, the features may include, without limitation, Eigenrank, HUB, URL depth, quality score, spam index, family friendliness, document length, anchor text score, match location, match frequency, term weight, and proximity.

The preference pairs of objects may be generated in different ways. In particular embodiments, for each reference, a set of objects is obtained in response to the reference. One or more unique pairs of objects may be formed from the set of objects such that each unique pair of objects consists of two different objects in the set of objects. Then, for each unique pair of objects, a preference is determined either manually, e.g., by a human being, or automatically, e.g., based on experimental or empirical data, with respect to the reference. For each unique pair of objects, if one of the two objects is more preferred than the other one of the two objects with respect to the reference, then the pair of objects is designated as one of the preference pairs of objects. On the other hand, if both of the objects are similarly or equally preferred with respect to the reference, then the pair of objects is discarded.

For example, suppose that for $r_i$, its corresponding set of objects, $O_i$, has 4 different objects, $\{o_{i,1}, o_{i,2}, o_{i,3}, O_{i,4}\}$. Note that a small number of objects are used in this example to simplify the discussion. In practice, there is no limitation on the number of objects that may be obtained for a reference. From these 4 objects, 6 unique pairs of objects may be formed, specifically $(o_{i,1}, o_{i,2})$, $(o_{i,1}, o_{i,3})$, $(o_{i,1}, o_{i,4})$, $(o_{i,2}, o_{i,3})$, $(o_{i,2}, o_{i,4})$, and $(o_{i,3}, o_{i,4})$. For each of the 6 pairs of objects, a preference between every two different objects may be determined with respect to $r_i$. For $(o_{i,1}, o_{i,2})$, it may be determined that $o_{i,1}$ is more preferred than $o_{i,2}$ with respect to $r_i$, i.e., $o_{i,1} > o_{i,2}$, and thus $(o_{i,1}, o_{i,2})$ is considered a preference pair of objects. Similarly, for $(o_{i,1}, o_{i,3})$, it may be determined that $o_{i,3}$ is more preferred than $o_{i,1}$ with respect to $r_i$, i.e., $o_{i,3} > o_{i,1}$, and thus $(o_{i,1}, o_{i,3})$ is considered a preference pair of objects. On the other hand, for $(o_{i,2}, o_{i,3})$, it may be determined that $o_{i,2}$ and $o_{i,3}$ are similarly preferred with respect to $r_i$, i.e., $o_{i,2} \approx o_{i,3}$ or $o_{i,2} = o_{i,3}$, and thus $(o_{i,2}, o_{i,3})$ is not considered a preference pair of objects and may be discarded.

In particular embodiments, for each reference, a set of objects is obtained in response to the reference. For each object in the set, an absolute preference score is determined either manually, e.g., by a human being, or automatically, e.g., based on experimental or empirical data, with respect to the reference. In particular embodiments, a preference score indicates a degree of preference for the corresponding object with respect to the reference, i.e., how preferred that particular object is with respect to the reference among the set of objects. For example, an object having a higher preference score may be more preferred than an object having a lower preference score with respect to the reference. If two objects have the same preference score, then the two objects are equally preferred with respect to the reference. One or more preference pairs of objects may be generated by selecting pairs of objects having different preference scores from the set of objects, and the preference scores of the pairs of objects in turn indicate the preference of the pairs of objects with respect to the reference.

Consider again the above example where for $r_i$, its corresponding set of objects, $o_i$, has 4 different objects, $\{o_{i,1}, o_{i,2}, o_{i,3}, o_{i,4}\}$. Suppose that each of the 4 objects has an absolute preference score with respect to $r_i$, such that the preference score of $o_{i,1}$ is 2, the preference score of $o_{i,2}$ is 1, the preference score of $o_{i,3}$ is 1, and the preference score of $o_{i,4}$ is 3. $o_{i,1}$ and $o_{i,2}$ have different preference scores, and thus they may form a preference pair of objects, $(o_{i,1}, o_{i,2})$, and their preference scores indicate that $o_{i,1}$ is more preferred than $o_{i,2}$ with respect to $r_i$, i.e., $o_{i,1} > o_{i,2}$. Similarly, $o_{i,2}$ and $o_{i,4}$ have different preference scores, and thus they may form a preference pair of objects, ($o_{i,2}$, $o_{i,4}$), and their preference scores indicate that $o_{i,4}$ is more preferred than $o_{i,2}$ with respect to $r_i$, i.e., $o_{i,4} > o_{i,2}$. On the other hand, $o_{i,2}$ and $o_{i,3}$ have the same preference score, and thus they may not form a preference pair of objects since their preference scores indicate that they are equally preferred with respect to $r_i$.

As described above with reference to step 210, an objective function may be defined for the ranking model. In particular embodiments, the objective function may be define as:

$$\frac{1}{2}\|w\|^2 + C \sum_{(o_i, o_j) \in P} l(w^T f_i - w^T f_j), \quad (1)$$

where: (1) w denotes a weight vector such that each element in w is a weight given to a particular feature value; (2) C denotes a coefficient and may be the inverse of a regularization parameter; (3) P denotes a set of preference pairs of objects that includes all of the preference pairs of objects in the pairwise training data, i.e., all the preference pairs of objects obtained with respect to all of the references; (4) for a particular preference pair of objects ($o_i$, $o_j$) having two different objects $O_i$ and $o_j$ in P, $f_i$ denotes the feature vector of $o_i$ and $f_j$ denotes the feature vector of $o_j$; and (5) $\ell$ denotes a suitable loss function that may be defined based on the type of ranking model involved and the type of objects being ranked by the ranking model. Note that the notations for the objects and the feature vectors used in Equation (1) differ slightly from the notations used in Tables (1) and (2). When training the ranking model, each preference pair of objects in the pairwise training data is used similarly regardless of which set of objects the preference pair comes from. Thus, the object set distinction is less important during the pairwise training process. To simplify the discussion, hereafter, ($o_i$, $o_j$) denotes any preference pair of objects in the pairwise training data that may come from any set of objects, and $f_i$ and $f_j$ denote the two feature vectors associated with $o_i$ and $o_j$ respectively. In particular embodiments, $\ell$ may be defined as:

$$\ell(w^T f_i - w^T f_j) = \max(0, 1 - (w^T f_i - w^T f_j))^2 \quad (2)$$

Steps 210 and 220 may be performed in any order since the two steps are not dependent upon each other. For example, step 210 may be performed before step 220, or step 220 may be performed before step 210, or steps 210 and 220 may be performed in parallel.

Once the ranking model and the pairwise training data have been obtained, the ranking model may be trained using the pairwise training data. In particular embodiments, the ranking model may be trained by minimizing Equation (1) and its gradient through an iterative process. During each iteration, at step 230, Equation (1) is calculated using all the preference pairs of objects in the pairwise training data, i.e., P. At step 240, the values of the elements of w in Equation (1) are adjusted based on a gradient optimization algorithm and a gradient iteration method. The gradient optimization algorithm may be any suitable type of gradient optimization algorithm, such as, without limitation, truncated Newton optimization algorithm, non-linear conjugated gradient optimization algorithm, or online gradient descent optimization algorithm. At step 250, it is determined whether a stopping criterion is satisfied. If the stopping criterion is satisfied, the process stops. Otherwise, the process returns to step 230 for another iteration.

In particular embodiments, the length of w, i.e., the number of elements of w, is the same as the length of the feature vectors, i.e., the number of feature values in each of the feature vectors. Hereafter, let $w_k$ denote a particular element in w. In particular embodiments, initially, the values of all the $w_k$'s of w are set to 0. Through the iteration process, the values of the individual $w_k$'s are gradually adjusted. In particular embodiments, the iteration process may be stopped when: (1) the process has reached a predetermined number of iterations; (2) the normalcy of the objective function has reached a predetermined threshold; or (3) the changes in the values of the $w_k$'s are sufficiently small between two consecutive iterations.

As explained above, the pairwise training data contains a set of preference pairs of objects, i.e., P; each preference pair of objects in the set contains two different objects, i.e., ($o_i$, $o_j$); and each of the objects has a feature vector containing one or more feature values, i.e., $f_i$ and $f_j$. Hereafter, let $n_p$ denote the total number of preference pairs of objects in P, $n_o$ denote the total number of unique objects in P, and $n_f$ denote the total number of feature values in each of the feature vectors, i.e., the length of the feature vectors.

The training of the ranking model, in effect, determines the values of the elements in w. Once w is determined, it may be used to ranking sets of objects with respect to references. In particular embodiments, if a set of objects is obtained in response to a reference, the objects in the set may be ranked with respect to the reference based on their ranking scores. In particular embodiments, for each object $o_i$ in the set having feature vector $f_i$, the ranking score of $o_i$, denoted by $rs_i$, may be calculated as $$rs_i = w \cdot f_i = \sum_{k=1}^{n_f} w_k \times f_{i,k}.$$

Objects having relatively higher ranking scores are ranked higher than objects having relatively ranking scores with respect to the reference.

In particular embodiments, the gradient of Equation (1) with respect to w may be define as:

$$g(w) = w + 2CX^T A^T D A X w, \quad (3)$$

where: (1) X denotes a matrix that represents the accumulation of the feature vectors, that is each row corresponds to a feature vector; (2) A denotes a sparse matrix of size $n_p \times n_o$ with each row of A encoding a preference pair of objects, such that for each ($o_i$, $o_j$)∈P, there exists a row k in A where element $A_{k,i} = 1$ and element $A_{k,j} = -1$ and all other elements in row k equal 0; and (3) D denotes a diagonal matrix of size $n_p \times n_p$, such that element $D_{k,k} = 1$ if the $k^{th}$ pair belongs to a set of support pairs and $D_{k,k} = 0$ otherwise. In particular embodiments, the set of support pairs, hereafter denoted as sp, may be defined as sp={($o_i, o_j$), ($w^T f_i - w^T f_j$)<1}, the set of preference pairs incurring a loss in the objective function.

As described above, in particular embodiments, training the ranking model involves iteratively calculating the objective function and the gradient of the objective function. Rewriting in Equation (1) the term $w^T f_i - w^T f_j$ in the loss as $w^T(f_i - f_j)$ results in a traditional classification problem on the preference pairs. As a result, the training process may take a great amount of time due to the extremely large number of preference pairs of objects typically used to train the pairwise ranking mode, i.e., $n_p$. For example, when naively applying the truncated Newton method, the complexity of the training process may be $O(n_p n_f)$.

In particular embodiments, by rearranging the terms in the objective function, it may be possible, as shown in Equation (3), to calculate the objective function and the gradient of the objective function without actually calculating the difference between the two feature vectors of the two objects in each preference pair of objects during every iteration. In fact, the difference between the two feature vectors of the two objects in each preference pair of objects may never need to be explicitly calculated during the training process. In particular embodiments, by avoiding to explicitly calculate the differences of the pairs of feature vectors, the complexity of the training process may be $O(n_o n_f + n_p)$.

As described above, one way to generate the preference pairs of object for the pairwise training data is to, for each preference reference, determine an absolute preference score for each of the objects in the set of objects obtained in response to the preference reference with respect to the preference reference. The preference pairs of objects may then be formed by selecting pairs of objects having different preference scores from the same set of objects.

In particular embodiments, if the absolute preference scores are available for the objects used in the pairwise training data, then the training process may be further sped up by using the absolute preference scores of the objects in addition to the preference pairs of objects. In this case, the complexity of the training process may be $O(n_o n_f + n_o \log n_o)$.

More specifically, using the truncated Newton method as an example, traditionally, computing the gradient of the objective function and doing Hessian times vector form the crucial time-consuming operations of the Newton training algorithm. The objective function in this case has the form $$\frac{1}{2}\|w\|^2 + CL, \tag{5}$$

where L denotes the accumulation of all loss terms. Hereafter, let $g_L$ denote the gradient of L. Then, the gradient of the objective function may be defined as $$g(w) = w + C g_L. \tag{6}$$

In particular embodiments, the training process may be improved by finding efficient ways of computing $g_L$.

To simplify the discussion, the improvement on the training process is first described using an example where the pairwise training data includes only a single reference and one or more preference pairs of objects generated with respect to this particular reference. In addition, the feature vectors of the objects in the pairwise training data are classified based on two preference levels, i.e., preferred and not preferred, or higher relevance and lower relevance.

For this example, the $n_o$ objects in P may be partitioned into two sets, $S_1$ and $S_2$, that define a binary classification problem: $S_1 = \{o_i: f_i \in pl_1\}$ and $S_2 = \{o_i: f_i \in pl_2\}$, with $pl_1$ and $pl_2$ denoting the two preference levels, e.g., $pl_1$ being preferred or higher relevance and $pl_2$ being not preferred or lower relevance. Thus, $o_i$ belongs to $S_1$ if $f_i$ is classified as preferred or having higher relevance, and $o_i$ belongs to $S_2$ if $f_i$ is classified as not preferred or having lower relevance.

The accumulation of all loss terms, L, may then be defined in terms of $S_1$ and $S_2$ as:

$$L = \sum_{o_i \in S_1, o_j \in S_2} l(c_i - c_j), \tag{8}$$

where (1) $o_i$ and $o_j$ denote two different objects from a particular preference pair of objects with $O_i$ being preferred over $o_j$ with respect to the corresponding reference; (2) $c_i$ denotes the classifier output of the feature vector of $o_i$, i.e., $w^T f_i$; (3) $c_j$ denotes the classifier output of the feature vector of $o_j$, i.e., $w^T f_j$; and (4) $\ell(c_i - c_j) = \max(0, 1 - (c_i - c_j))^2$. Furthermore, for the classifications of the feature vectors:

$$\overline{c}_i = \begin{cases} c_i - \frac{1}{2}; & o_i \in S_1 \\ c_i + \frac{1}{2}; & o_i \in S_2. \end{cases} \tag{9}$$

Then, $\ell(c_i - c_j)$ may be rewritten more simply as $\ell(c_i - c_j) = \max(0, \overline{c}_j - \overline{c}_i)^2$.

Let $S_{2,i} = \{o_j \in S_2 : \overline{c}_j > \overline{c}_i\}$ for $o_i \in S_1$ and $S_{1,j} = \{o_i \in S_1 : \overline{c}_j > \overline{c}_i\}$ for $o_j \in S_2$. Writing $(\overline{c}_j - \overline{c}_i)^2$ as $\overline{c}_j^2 - \overline{c}_j \overline{c}_i - \overline{c}_i \overline{c}_j + \overline{c}_i^2$, summing the first two terms by the order $o_j$ and $o_i$, reversing the order of summation for the other two terms, and simplifying the terms result in L being rewritten as:

$$L = \sum_{k=1}^{n_o} \alpha_k \overline{c}_k^2 - \beta_k \overline{c}_k, \tag{10}$$

where:

$$\alpha_i = |S_{2,i}| \text{ for } o_i \in S_1; \tag{1}$$

$$\alpha_j = |S_{1,j}| \text{ for } o_j \in S_2; \tag{2}$$

$$\beta_i = \sum_{o_j \in S_{2,i}} \overline{c}_j \text{ for } o_i \in S_1; \tag{3}$$

$$\beta_j = \sum_{o_i \in S_{1,j}} \overline{c}_i \text{ for } o_j \in S_2; \tag{4}$$

and $$|S| \tag{5}$$

denotes the cardinality of a set S.

The gradient of L, $g_L$, may be rewritten as:

$$g_L := \frac{\partial L}{\partial w} = X^T \frac{\partial L}{\partial c}, \tag{11}$$

and $$\frac{\partial L}{\partial c_k} = 2(\alpha_k \overline{c}_k - \beta_k),$$

where $$\forall k = 1, \ldots, n_o. \tag{12}$$

In Equation (12), the "2" factor applies to the $\beta_k$ term so as to take care of the dependence of $\beta_k$ on $\overline{c}_k$.

The complexity of computing $c = Xw$ may be $O(n_o n_f)$. The complexity of determining the $\alpha$ and $\beta$ vectors may be $O(n_o \log n_o)$ by sorting $\overline{c}$ and doing operations using it. The complexity of computing $$X^T \frac{\partial L}{\partial c}$$

may be $O(n_o n_f)$. Thus, the complexity of determining $g_L$ may be $O(n_o n_f + n_o \log n_o)$.

In particular embodiments, a non-linear conjugate gradient algorithm may be used to minimize Equation (1) in which the gradients are computed efficiently using the techniques described above. In other embodiments, Newton based optimization algorithms may be used to minimize Equation (1). In such embodiments, it is necessary to compute the product of the Hessian and a vector, which may also be computed efficiently using similar techniques as the ones described above.

Equation (2) defines one type of loss function. In particular embodiments, the above concept may be extended to other margin-based loss functions. For example, consider the hinge loss, defined as:

$$\ell_{(w^T f_i - w^T f_j)} = \max(0, 1 - (w^T f_i - w^T f_j)) \quad (16)$$

From Equation (8), the loss and sub-gradient may be expressed as:

$$L = -\sum_{k=1}^{n_o} t_k \alpha_k \bar{c}_k,$$

where $$\frac{\partial L}{\partial c_k} = -t_k \alpha_k \quad (17)$$

$$\forall \, k = 1, \ldots, n_o,$$

where $t_k = 1$ if $o_k \in S_1$ and $t_k = -1$ if $o_k \in S_2$. Since L is non-differentiable for l, a bundle method may be employed. Another example for the loss function is Huber loss. More generally, the objective function and its gradient may be computed efficiently for any piecewise quadratic function. In particular embodiments, the complexity may scale linearly with the number of pieces. One application is the logistic loss, which may be approximated by a piecewise quadratic function.

As indicated above, thus far, the improvement on the training process has been described in the special case where the pairwise training data includes only a single reference and one or more preference pairs of objects generated with respect to this particular reference. The feature vectors of the objects in the pairwise training data are classified based on two preference levels. In particular embodiments, the concept may be extended to the general case where the pairwise training data may include multiple references and multiple preference pairs of objects generated with respect to these references, and the objects and their feature vectors may be classified based on multiple preference levels, i.e., two or more preference levels.

In particular embodiments, instead of classifying the objects and their feature vectors in two preference levels, i.e., binary classification, the objects may be classified with respect to multiple preference levels. Consequently, the feature vectors of the objects may be assigned preference level labels that represent any of the preference levels. Recall that in order to achieve the improvement on the training process for these particular embodiments, the objects in the pairwise training data need to have the absolute preference scores with respect to their corresponding references. In particular embodiments, the objects may be classified into the multiple preference levels based on their absolute preference scores. For example, each of the preference levels may include a particular range of the absolute preference scores.

Hereafter, let $n_{pl}$ denote the total number of preference levels for classifying the objects and their feature vectors. Each of the objects and its feature vector in the pairwise training data may be assigned a particular preference level label that may be a number between 1 and $n_{pl}$. In particular embodiments, 1 may represent the least preferred level and $n_{pl}$ may represent the most preferred level.

As described above, the preference pairs of objects are generated with respect to the individual references. For each of the references, one or more preference pairs of objects may be generated. P then contains all the preference pairs of objects generated with respect to all the references. Hereafter, let $n_r$ denote the total number of references in the pairwise training data, and for each particular reference, $r_i$, let $P_i$ denote the one or more of the preferences pairs of objects generated with respect to $r_i$. Thus, there are a total of $n_r$ $P_i$'s corresponding to the $n_r$ references, and the $P_i$'s are mutually exclusive with each other. Then, P may be considered as the union of all the $P_i$'s, such that $$P = \bigcup_{i=1}^{n_r} P_i.$$

In addition, each object in the pairwise training data may be classified to one of the $n_{pl}$ preference levels. Therefore, within each $P_i$, the preference pairs may be further divided into one or more mutually exclusive subsets of preferences objects based on the preference levels. Recall that for each preference pair of objects, one object is preferred over the other object. Hereafter, in particular embodiments, let $P_{i,j}$ denote a subset of preference pairs of objects within $P_i$ where for every preference pair of objects in $P_{i,j}$, the more preferred one of the two objects is classified at preference level j, and j is a number between 1 and $n_{pl}$. Thus, for each $P_i$, there are a total of $n_{pl}$ $P_{i,j}$'s corresponding to the $n_{pl}$ preference levels. Note that for each $P_{i,j}$, the objects in $P_{i,j}$ are either classified at preference level j or below preference level j.

Alternatively, in particular embodiments, $P_{i,j}$ may be constructed for each $P_i$ such that for every preference pair of objects in $P_{i,j}$, the less preferred one of the two objects is classified at preference level j, and j is again a number between 1 and $n_{pl}$. For each $P_i$, there are again a total of $n_{pl}$ $P_{i,j}$'s corresponding to the $n_{pl}$ preference levels. However, in this case, for each $P_{i,j}$, the objects in $P_{i,j}$ are either classified at preference level j or above preference level j.

Then, regardless of how $P_{i,j}$ is defined, P may be considered as the union of all the $P_{i,j}$'s, such that $$P = \bigcup_{i=1}^{n_r} \bigcup_{j=1}^{n_{pl}} P_{i,j}.$$

The objective function, as defined in Equation (1), may then be rewritten as:

$$\frac{1}{2} \|w\|^2 + C \sum_{i=1}^{n_r} \sum_{j=1}^{n_{pl}} \sum_{(o_m, o_n) \in P_{i,j}} l(w^T f_m - w^T f_n), \quad (18)$$

The complexity of computing the gradient associated with the inner-most summation is $O(n_{i,j} \log n_{i,j} + n_{i,j} n_f)$ with $n_{i,j} = |P_{i,j}|$. For each $P_{i,j}$, the objects in $P_{i,j}$ may be divided into two classes, i.e., binary classification, similar to the concept described above for $S_1$ and $S_2$. Here, in particular embodiments, for each $P_{i,j}$, one class, e.g., $S_1$, may contain all the objects classified at preference level j, and the other class, e.g., $S_2$, may contain all the objects classified below preference level j.

Since $$\sum_{i=1}^{n_r} \sum_{j=1}^{n_{pl}} n_{i,j} = n_o$$

and $$\sum_{i=1}^{n_r} \sum_{j=1}^{n_{pl}} n_{i,j} \log n_{i,j} \leq n_o \log n_o,$$

the overall complexity of the gradient computation is $O(n_o n_f + n_o \log n_o)$. Similarly, the complexity of computing the Hessian times vector is $O(n_o n_f)$.

For very large datasets, it has been argued that online learning algorithms such as stochastic gradient descent converge faster to a good solution than batch algorithms. In particular embodiments, any SVM solver algorithm may be applied to solve a ranking model designed with a pairwise method such as SVM. Existing methods have the potential drawback that it scales linearly with |P| or quadratically with $O(n_o n_f)$. In particular embodiments, to improve the training process, the stochastic gradient descent is applied at the reference level instead of the preference pair level. In particular embodiments, a reference is selected at random, and the gradient of the part of the objective function associated with the selected reference is computed, which may be done in $O(n_o \log n_o)$ time. A step may then be taken in that direction.

In particular embodiments, a different cost to may be given to each of the misclassified pair of objects $(o_i, o_j) \in P$. An inversion at the top of the ranking is often more costly than one at the bottom. In addition, an inversion between two objects having several preference levels of difference may be penalized more heavily than between two objects from two adjacent preference levels or having few preference levels of difference. There are different ways to introduce cost into the loss function, such as margin resealing and slack resealing. Both examples may yield an upper bound on the loss.

In particular embodiments, it may be desirable to obtain a nonlinear function through the use of a kernel function K. A training point, e.g., $f_i$, may be mapped to an implicit high dimensional feature space. Kernel methods may be applied to the dual method or the primal method. In particular embodiments, the optimization may be performed directly in the feature space.

The method described above may be implemented as computer software using computer-readable instructions and physically stored in computer-readable medium. A "computer-readable medium" as used herein may be any medium that can contain, store, communicate, propagate, or transport the program for use by or in connection with the instruction execution system, apparatus, system or device. The computer readable medium may be, by way of example only but not by limitation, an electronic, magnetic, optical, electromagnetic, infrared, or semiconductor system, apparatus, system, device, propagation medium, or computer memory.

The computer software may be encoded using any suitable computer languages, including future programming languages. Different programming techniques can be employed, such as, for example, procedural or object oriented. The software instructions may be executed on various types of computers, including single or multiple processor devices.

Particular embodiments may be implemented as hardware, software, or a combination of hardware and software. For example and without limitation, one or more computer systems may execute particular logic or software to perform one or more steps of one or more processes described or illustrated herein. One or more of the computer systems may be unitary or distributed, spanning multiple computer systems or multiple datacenters, where appropriate. The present disclosure contemplates any suitable computer system. In particular embodiments, performing one or more steps of one or more processes described or illustrated herein need not necessarily be limited to one or more particular geographic locations and need not necessarily have temporal limitations. As an example and not by way of limitation, one or more computer systems may carry out their functions in "real time," "offline," in "batch mode," otherwise, or in a suitable combination of the foregoing, where appropriate. One or more of the computer systems may carry out one or more portions of their functions at different times, at different locations, using different processing, where appropriate. Herein, reference to logic may encompass software, and vice versa, where appropriate. Reference to software may encompass one or more computer programs, and vice versa, where appropriate. Reference to software may encompass data, instructions, or both, and vice versa, where appropriate. Similarly, reference to data may encompass instructions, and vice versa, where appropriate.

One or more computer-readable storage media may store or otherwise embody software implementing particular embodiments. A computer-readable medium may be any medium capable of carrying, communicating, containing, holding, maintaining, propagating, retaining, storing, transmitting, transporting, or otherwise embodying software, where appropriate. A computer-readable medium may be a biological, chemical, electronic, electromagnetic, infrared, magnetic, optical, quantum, or other suitable medium or a combination of two or more such media, where appropriate. A computer-readable medium may include one or more nanometer-scale components or otherwise embody nanometer-scale design or fabrication. Example computer-readable storage media include, but are not limited to, compact discs (CDs), field-programmable gate arrays (FPGAs), floppy disks, floptical disks, hard disks, holographic storage devices, integrated circuits (ICs) (such as application-specific integrated circuits (ASICs)), magnetic tape, caches, programmable logic devices (PLDs), random-access memory (RAM) devices, read-only memory (ROM) devices, semiconductor memory devices, and other suitable computer-readable storage media.

Software implementing particular embodiments may be written in any suitable programming language (which may be procedural or object oriented) or combination of programming languages, where appropriate. Any suitable type of computer system (such as a single- or multiple-processor computer system) or systems may execute software implementing particular embodiments, where appropriate. A general-purpose computer system may execute software implementing particular embodiments, where appropriate.

Figure 3:
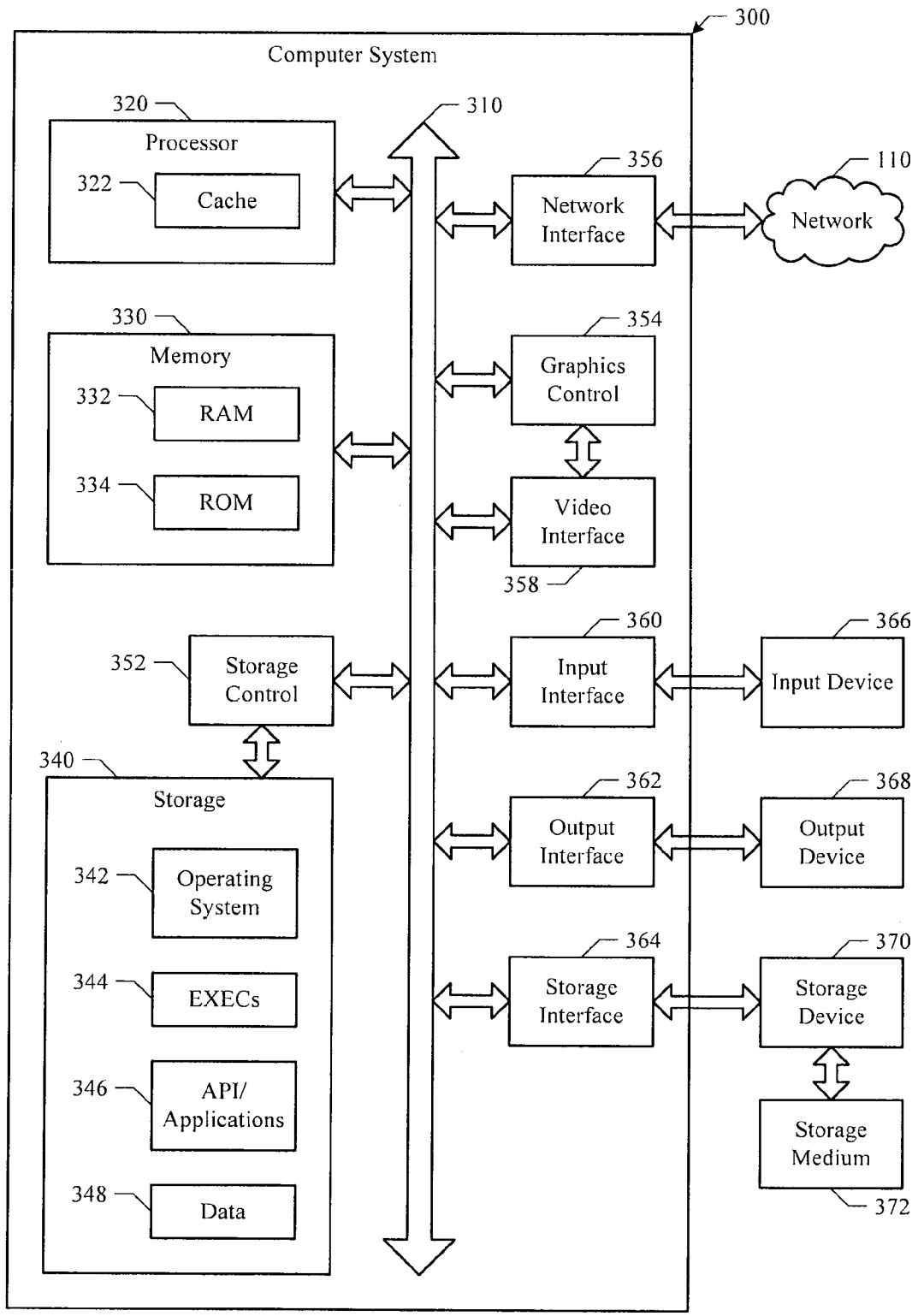
FIG. 3 illustrates an example computer system.

For example, FIG. 3 illustrates an example computer system 300 suitable for implementing one or more portions of particular embodiments. Although the present disclosure describes and illustrates a particular computer system 300 having particular components in a particular configuration, the present disclosure contemplates any suitable computer system having any suitable components in any suitable configuration. Moreover, computer system 300 may have take any suitable physical form, such as for example one or more integrated circuit (ICs), one or more printed circuit boards (PCBs), one or more handheld or other devices (such as mobile telephones or PDAs), one or more personal computers, or one or more super computers.

System bus 310 couples subsystems of computer system 300 to each other. Herein, reference to a bus encompasses one or more digital signal lines serving a common function. The present disclosure contemplates any suitable system bus 310 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 300 includes one or more processors 320 (or central processing units (CPUs)). A processor 320 may contain a cache 322 for temporary local storage of instructions, data, or computer addresses. Processors 320 are coupled to one or more storage devices, including memory 330. Memory 330 may include random access memory (RAM) 332 and read-only memory (ROM) 334. Data and instructions may transfer bidirectionally between processors 320 and RAM 332. Data and instructions may transfer unidirectionally to processors 320 from ROM 334. RAM 332 and ROM 334 may include any suitable computer-readable storage media.

Computer system 300 includes fixed storage 340 coupled bi-directionally to processors 320. Fixed storage 340 may be coupled to processors 320 via storage control unit 352. Fixed storage 340 may provide additional data storage capacity and may include any suitable computer-readable storage media. Fixed storage 340 may store an operating system (OS) 342, one or more executables 344, one or more applications or programs 346, data 348, and the like. Fixed storage 340 is typically a secondary storage medium (such as a hard disk) that is slower than primary storage. In appropriate cases, the information stored by fixed storage 340 may be incorporated as virtual memory into memory 330.

Processors 320 may be coupled to a variety of interfaces, such as, for example, graphics control 354, video interface 358, input interface 360, output interface 362, and storage interface 364, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 356 may couple processors 320 to another computer system or to network 110. With network interface 356, processors 320 may receive or send information from or to network 110 in the course of performing steps of particular embodiments. Particular embodiments may execute solely on processors 320. Particular embodiments may execute on processors 320 and on one or more remote processors operating together.

In a network environment, where computer system 300 is connected to network 110, computer system 300 may communicate with other devices connected to network 110. Computer system 300 may communicate with network 110 via network interface 356. For example, computer system 300 may receive information (such as a request or a response from another device) from network 110 in the form of one or more incoming packets at network interface 356 and memory 330 may store the incoming packets for subsequent processing. Computer system 300 may send information (such as a request or a response to another device) to network 110 in the form of one or more outgoing packets from network interface 356, which memory 330 may store prior to being sent. Processors 320 may access an incoming or outgoing packet in memory 330 to process it, according to particular needs.

Computer system 300 may have one or more input devices 366 (which may include a keypad, keyboard, mouse, stylus, etc.), one or more output devices 368 (which may include one or more displays, one or more speakers, one or more printers, etc.), one or more storage devices 370, and one or more storage medium 372. An input device 366 may be external or internal to computer system 300. An output device 368 may be external or internal to computer system 300. A storage device 370 may be external or internal to computer system 300. A storage medium 372 may be external or internal to computer system 300.

Particular embodiments involve one or more computer-storage products that include one or more computer-readable storage media that embody software for performing one or more steps of one or more processes described or illustrated herein. In particular embodiments, one or more portions of the media, the software, or both may be designed and manufactured specifically to perform one or more steps of one or more processes described or illustrated herein. In addition or as an alternative, in particular embodiments, one or more portions of the media, the software, or both may be generally available without design or manufacture specific to processes described or illustrated herein. Example computer-readable storage media include, but are not limited to, CDs (such as CD-ROMs), FPGAs, floppy disks, floptical disks, hard disks, holographic storage devices, ICs (such as ASICs), magnetic tape, caches, PLDs, RAM devices, ROM devices, semiconductor memory devices, and other suitable computer-readable storage media. In particular embodiments, software may be machine code which a compiler may generate or one or more files containing higher-level code which a computer may execute using an interpreter.

As an example and not by way of limitation, memory 330 may include one or more computer-readable storage media embodying software and computer system 300 may provide particular functionality described or illustrated herein as a result of processors 320 executing the software. Memory 330 may store and processors 320 may execute the software. Memory 330 may read the software from the computer-readable storage media in mass storage device 330 embodying the software or from one or more other sources via network interface 356. When executing the software, processors 320 may perform one or more steps of one or more processes described or illustrated herein, which may include defining one or more data structures for storage in memory 330 and modifying one or more of the data structures as directed by one or more portions the software, according to particular needs. In addition or as an alternative, computer system 300 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method implemented on at least one machine each of which has at least one processor, storage, and a communication platform connected to a network, the method comprising:
   accessing a ranking model and an objective function of the ranking model, wherein given a reference and a set of objects, the ranking model ranks the set of objects with respect to the reference, and the objective function represents erroneous predictions made by the ranking model;
   accessing one or more preference pairs of objects, wherein for each of the preference pairs of objects comprising a first object and a second object:
      the first object and the second object are obtained in response to a particular one of one or more references,
      there is a preference between the first object and the second object with respect to the particular reference,
      the first object has a first feature vector comprising one or more first feature values, wherein each of the first feature values characterizes a property of the first object, the particular reference, or the first object and the particular reference together, and
      the second object has a second feature vector comprising one or more second feature values, wherein each of the second feature values characterizes a property of the second object, the particular reference, or the second object and the particular reference together; and
   training the ranking model by minimizing the objective function using the preference pairs of objects, wherein for each of the preference pairs of objects, a difference between the first feature vector of the first object and the second feature vector of the second object is not calculated.

2. The method as recited in claim 1, further comprising:
   for each of the references, obtaining a set of objects in response to the reference; and
   generating one or more of the preference pairs of objects from the set of objects.

3. The method as recited in claim 2, wherein the training of the ranking model has a complexity of $O(n_o n_f + n_p)$, where $n_f$ denotes a number of feature values in each feature vector; $n_o$ denotes a number of objects in the preference pairs of objects, and $n_p$ denotes a number of preference pairs of objects.

4. The method as recited in claim 2, wherein for each of the references, generating one or more of the preference pairs of objects from the set of objects comprises:
   constructing one or more unique pairs of objects, wherein each of the unique pairs of objects comprises two different objects in the set of objects; and
   for each of the unique pairs of objects:
      determining a preference between the two objects with respect to the reference;
      determining two feature vectors for the two objects; and
      designating the unique pair of objects with the preference and the two feature vectors as one of the preference pairs of objects.

5. The method as recited in claim 2, wherein for each of the references, generating one or more of the preference pairs of objects from the set of objects comprises:
   for each object in the set of objects:
      determining a preference rank with respect to the reference, and
      determining a feature vector; and
   constructing one or more of the preference pairs of objects, wherein:
      each of the preference pairs of objects comprises two different objects in the set of objects having two different preference ranks, and
      the preference ranks of the two objects indicate the preference of each of the preference pairs of objects.

6. The method as recited in claim 5, wherein minimizing the objective function further uses the preference ranks of the objects in the sets of objects obtained in response to the references, comprising:
   defining a plurality of preference levels;
   assigning a preference level to each object in the preference pairs of objects based on the preference rank of the object;
   dividing the preference pairs of objects into a plurality of mutually exclusive subsets based on the references and the preference levels, wherein:
      each of the subsets corresponds to a particular one of the references and a particular one of the preference levels and contains zero or more of the preference pairs of objects, and
      for each of the subsets:
         the preference pairs of objects in the subset are constructed for the corresponding reference, and
         between each preference pair of objects, the more preferred object has the corresponding preference level; and
   for each of the subsets, dividing the objects in the subset into two classes comprising a first class and a second class, wherein an object having the corresponding preference level belonging to the first class and an object below the corresponding preference level belonging to the second class; and
   minimizing the objective function further based on the classes of the objects.

7. The method as recited in claim 6, wherein the training of the ranking model has a complexity of $O(n_o n_f + n_p \log n_o)$, where $n_f$ denotes a number of feature values in each feature vector; and $n_o$ denotes a number of objects in the preference pairs of objects.

8. The method as recited in claim 1, wherein the objective function is defined as $$\frac{1}{2}\|w\|^2 + C \sum_{(i,j) \in P} l(w^T f_i - w^T f_j),$$

where:
w denotes a weight vector,
C denotes a coefficient,
P denotes all of the second pairs of objects,
$f_i$ denotes the first feature vector and $f_j$ denotes the second feature vector of each of the second pairs of objects, and
l denotes a loss function.

9. The method as recited in claim 8, wherein training the ranking model comprises:
   initializing w; and
   iteratively calculating the objective function and the gradient of the objective function and adjusting w based on the gradient of the objective function without calculating the differences between the feature vectors of the preference pairs of objects until a predetermined stopping criterion is satisfied.

10. The method as recited in claim 8, wherein:
    the objective function is minimized based on a gradient optimization algorithm and a gradient iteration method, and
    the gradient optimization algorithm is truncated Newton optimization algorithm, non-linear conjugated gradient optimization algorithm, or online gradient descent optimization algorithm.

11. The method as recited in claim 8, further comprising:
    obtaining a set of objects in response to the reference; and
    ranking the set of objects with respect to the reference using the ranking model, comprising:
    for each object in the set of objects, calculating a preference rank with respect to the reference as w·f, where f denotes the feature vector of the object; and
    ranking the set of objects based on their preference ranks.

12. A system comprising:
    a memory comprising instructions executable by one or more processors; and
    one or more processors coupled to the memory and operable to execute the instructions, the one or more processors being operable when executing the instructions to:
    access a ranking model and an objective function of the ranking model, wherein given a reference and a set of objects, the ranking model ranks the set of objects with respect to the reference, and the objective function represents erroneous predictions made by the ranking model;
    access one or more preference pairs of objects, wherein for each of the preference pairs of objects comprising a first object and a second object:
       the first object and the second object are obtained in response to a particular one of one or more references,
       there is a preference between the first object and the second object with respect to the particular reference,
       the first object has a first feature vector comprising one or more first feature values, wherein each of the first feature values characterizes a property of the first object, the particular reference, or the first object and the particular reference together, and
       the second object has a second feature vector comprising one or more second feature values, wherein each of the second feature values characterizes a property of the second object, the particular reference, or the second object and the particular reference together; and
    train the ranking model by minimizing the objective function using the preference pairs of objects, wherein for each of the preference pairs of objects, a difference between the first feature vector of the first object and the second feature vector of the second object is not calculated.

13. The system as recited in claim 12, wherein the one or more processors being further operable when executing the instructions to:
    for each of the references, obtain a set of objects in response to the reference; and
    generate one or more of the preference pairs of objects from the set of objects.

14. The system as recited in claim 13, wherein the training of the ranking model has a complexity of $O(n_o n_f + n_p)$, where $n_f$ denotes a number of feature values in each feature vector; $n_o$ denotes a number of objects in the preference pairs of objects, and $n_p$ denotes a number of preference pairs of objects.

15. The system as recited in claim 13, wherein for each of the references, to generate one or more of the preference pairs of objects from the set of objects comprises:
    construct one or more unique pairs of objects, wherein each of the unique pairs of objects comprises two different objects in the set of objects; and
    for each of the unique pairs of objects:
       determine a preference between the two objects with respect to the reference;
       determine two feature vectors for the two objects; and
       designate the unique pair of objects with the preference and the two feature vectors as one of the preference pairs of objects.

16. The system as recited in claim 13, wherein for each of the references, to generate one or more of the preference pairs of objects from the set of objects comprises:
    for each object in the set of objects:
       determine a preference rank with respect to the reference, and
       determine a feature vector; and
    construct one or more of the preference pairs of objects, wherein:
       each of the preference pairs of objects comprises two different objects in the set of objects having two different preference ranks, and
       the preference ranks of the two objects indicate the preference of each of the preference pairs of objects.

17. The system as recited in claim 16, wherein to minimize the objective function further uses the preference ranks of the objects in the sets of objects obtained in response to the references, comprising:
    define a plurality of preference levels;
    assign a preference level to each object in the preference pairs of objects based on the preference rank of the object;
    divide the preference pairs of objects into a plurality of mutually exclusive subsets based on the references and the preference levels, wherein:
       each of the subsets corresponds to a particular one of the references and a particular one of the preference levels and contains zero or more of the preference pairs of objects, and
       for each of the subsets:
          the preference pairs of objects in the subset are constructed for the corresponding reference, and
          between each preference pair of objects, the more preferred object has the corresponding preference level; and
    for each of the subsets, divide the objects in the subset into two classes comprising a first class and a second class, wherein an object having the corresponding preference level belonging to the first class and an object below the corresponding preference level belonging to the second class; and minimize the objective function further based on the classes of the objects.

18. The system as recited in claim 17, wherein the training of the ranking model has a complexity of $O(n_o n_f + n_p \log n_o)$, where $n_f$ denotes a number of feature values in each feature vector; and $n_o$ denotes a number of objects in the preference pairs of objects.

19. The system as recited in claim 12, wherein the objective function is defined as $$\frac{1}{2}\|w\|^2 + C \sum_{(i,j) \in P} l(w^T f_i - w^T f_j),$$

where:
w denotes a weight vector,
C denotes a coefficient,
P denotes all of the second pairs of objects,
$f_i$ denotes the first feature vector and $f_j$ denotes the second feature vector of each of the second pairs of objects, and
l denotes a loss function.

20. The system as recited in claim 19, wherein to train the ranking model comprises:
initialize w; and
iteratively calculate the objective function and the gradient of the objective function and adjusting w based on the gradient of the objective function without calculating the differences between the feature vectors of the preference pairs of objects until a predetermined stopping criterion is satisfied.

21. The system as recited in claim 19, wherein:
the objective function is minimized based on a gradient optimization algorithm and a gradient iteration method, and
the gradient optimization algorithm is truncated Newton optimization algorithm, non-linear conjugated gradient optimization algorithm, or online gradient descent optimization algorithm.

22. The system as recited in claim 19, the one or more processors being further operable when executing the instructions to:
obtain a set of objects in response to the reference; and
rank the set of objects with respect to the reference using the ranking model, comprising:
for each object in the set of objects, calculate a preference rank with respect to the reference as w·f, where f denotes the feature vector of the object; and
rank the set of objects based on their preference ranks.

23. A machine-readable tangible and non-transitory medium having information recorded thereon, wherein the information, when read by the machine, causes the machine to perform the following:
accessing a ranking model and an objective function of the ranking model, wherein given a reference and a set of objects, the ranking model ranks the set of objects with respect to the reference, and the objective function represents erroneous predictions made by the ranking model;
accessing one or more preference pairs of objects, wherein for each of the preference pairs of objects comprising a first object and a second object:
the first object and the second object are obtained in response to a particular one of one or more references, there is a preference between the first object and the second object with respect to the particular reference,
the first object has a first feature vector comprising one or more first feature values, wherein each of the first feature values characterizes a property of the first object, the particular reference, or the first object and the particular reference together, and
the second object has a second feature vector comprising one or more second feature values, wherein each of the second feature values characterizes a property of the second object, the particular reference, or the second object and the particular reference together; and
training the ranking model by minimizing the objective function using the preference pairs of objects, wherein for each of the preference pairs of objects, a difference between the first feature vector of the first object and the second feature vector of the second object is not calculated.

24. The medium as recited in claim 23, further comprising:
for each of the references, obtain obtaining a set of objects in response to the reference; and
generating one or more of the preference pairs of objects from the set of objects.

25. The medium as recited in claim 24, wherein the training of the ranking model has a complexity of $O(n_o n_f + n_p)$, where $n_f$ denotes a number of feature values in each feature vector; $n_o$ denotes a number of objects in the preference pairs of objects, and $n_p$ denotes a number of preference pairs of objects.

26. The medium as recited in claim 24, wherein for each of the references, generating one or more of the preference pairs of objects from the set of objects comprises:
constructing one or more unique pairs of objects, wherein each of the unique pairs of objects comprises two different objects in the set of objects; and
for each of the unique pairs of objects:
determining a preference between the two objects with respect to the reference;
determining two feature vectors for the two objects; and
designating the unique pair of objects with the preference and the two feature vectors as one of the preference pairs of objects.

27. The medium as recited in claim 24, wherein for each of the references, generating one or more of the preference pairs of objects from the set of objects comprises:
for each object in the set of objects:
determining a preference rank with respect to the reference, and
determining a feature vector; and
constructing one or more of the preference pairs of objects, wherein:
each of the preference pairs of objects comprises two different objects in the set of objects having two different preference ranks, and
the preference ranks of the two objects indicate the preference of each of the preference pairs of objects.

28. The medium as recited in claim 27, wherein minimizing the objective function further uses the preference ranks of the objects in the sets of objects obtained in response to the references, comprising:
defining a plurality of preference levels;
assigning a preference level to each object in the preference pairs of objects based on the preference rank of the object;
dividing the preference pairs of objects into a plurality of mutually exclusive subsets based on the references and the preference levels, wherein:

each of the subsets corresponds to a particular one of the references and a particular one of the preference levels and contains zero or more of the preference pairs of objects, and for each of the subsets:
the preference pairs of objects in the subset are constructed for the corresponding reference, and
between each preference pair of objects, the more preferred object has the corresponding preference level; and for each of the subsets, dividing the objects in the subset into two classes comprising a first class and a second class, wherein an object having the corresponding preference level belonging to the first class and an object below the corresponding preference level belonging to the second class; and minimizing the objective function further based on the classes of the objects.

29. The medium as recited in claim 28, wherein the training of the ranking model has a complexity of $O(n_o n_f + n_p \log n_o)$, where $n_f$ denotes a number of feature values in each feature vector; and $n_o$ denotes a number of objects in the preference pairs of objects.

30. The medium as recited in claim 23, wherein the objective function is defined as $$\frac{1}{2}\|w\|^2 + C \sum_{(i,j) \in P} l(w^T f_i - w^T f_j),$$

where:
w denotes a weight vector,
C denotes a coefficient,
P denotes all of the second pairs of objects,
$f_i$ denotes the first feature vector and $f_j$ denotes the second feature vector of each of the second pairs of objects, and
l denotes a loss function.

31. The media as recited in claim 30, wherein training the ranking model comprises:
initializing w; and
iteratively calculating the objective function and the gradient of the objective function and adjusting w based on the gradient of the objective function without calculating the differences between the feature vectors of the preference pairs of objects until a predetermined stopping criterion is satisfied.

32. The medium as recited in claim 30, wherein:
the objective function is minimized based on a gradient optimization algorithm and a gradient iteration method, and
the gradient optimization algorithm is truncated Newton optimization algorithm, non-linear conjugated gradient optimization algorithm, or online gradient descent optimization algorithm.

33. The medium as recited in claim 30, further comprising:
obtaining a set of objects in response to the reference; and
ranking the set of objects with respect to the reference using the ranking model, comprising:
for each object in the set of objects, calculating a preference rank with respect to the reference as w·f, where f denotes the feature vector of the object; and
ranking the set of objects based on their preference ranks.

* * * * *